(12) United States Patent
Xia (10) Patent No.: US 11,971,134 B2
(45) Date of Patent: Apr. 30, 2024

(54) MULTIFUNCTIONAL BRACKET

(71) Applicant: CRAFTGEEK LLC, Irvine, CA (US)

(72) Inventor: Meihua Xia, Shenzhen (CN)

(73) Assignee: CRAFTGEEK LLC, Irvine, CA (US)

( * ) Notice: Subject to any disclaimer, the term of this patent is extended or adjusted under 35 U.S.C. 154(b) by 0 days.

(21) Appl. No.: 17/933,870

(22) Filed: Sep. 21, 2022

(65) Prior Publication Data

US 2023/0095224 A1    Mar. 30, 2023

(30) Foreign Application Priority Data

Sep. 24, 2021   (CN) .......................... 202122328601.3

(51) Int. Cl.
*F16M 11/28* (2006.01)
*F16M 11/20* (2006.01)
*F16M 11/36* (2006.01)

(52) U.S. Cl.
CPC ......... *F16M 11/28* (2013.01); *F16M 11/2014* (2013.01); *F16M 11/36* (2013.01)

(58) Field of Classification Search
CPC ..... F16M 11/28; F16M 11/2014; F16M 11/36
See application file for complete search history.

(56) References Cited

U.S. PATENT DOCUMENTS

| | | | | |
|---|---|---|---|---|
| 5,421,549 | A * | 6/1995 | Richards ................ | F16M 11/10 396/419 |
| 9,328,862 | B2 * | 5/2016 | Hu ....................... | F16M 11/242 |
| 10,247,353 | B1 * | 4/2019 | Chen ...................... | F16B 2/12 |

(Continued)

FOREIGN PATENT DOCUMENTS

| CN | 2914143 Y | * | 6/2007 |
|---|---|---|---|
| CN | 202252694 U | * | 5/2012 |

(Continued)

OTHER PUBLICATIONS

Limostudio photo tripod stand model No. AGG3076 sold on amazon. com dated Apr. 13, 2020, https://www.amazon.com/LS-LIMO-STUDIO-LIMOSTUDIO-AGG3076/dp/B0872HGJ29 (Year: 2020).*

(Continued)

*Primary Examiner* — Terrell L McKinnon
*Assistant Examiner* — Ding Y Tan (57) ABSTRACT

The invention discloses a multifunctional support stand, including a supporting assembly, a pan-tilt assembly, and a tripod assembly. The supporting assembly has a first end and a second end that are opposite to each other in a length direction thereof. The pan-tilt assembly is telescopically arranged on the first end of the supporting assembly. The pan-tilt assembly is configured to be placed with a load device. The tripod assembly is switchably arranged at the second end of the supporting assembly between a support position and a storage position. The invention proposes a multifunctional support stand. A supporting pan-tilt of the support stand may be stored in a supporting rod. A supporting frame may be folded on the supporting rod. The supporting pan-tilt may be adjusted at any supporting angle, and may be flexibly switchable among different supporting positions, thus realizing functions of supporting a small load device and a large load device. The invention is suitable for a variety of application scenarios.

8 Claims, 7 Drawing Sheets

(56) References Cited

U.S. PATENT DOCUMENTS

| | | | | |
|---|---|---|---|---|
| D916,172 S | * | 4/2021 | Zeng | D16/244 |
| 11,221,544 B1 | * | 1/2022 | York | F16M 11/24 |
| D974,453 S | * | 1/2023 | Li | D16/244 |
| 2002/0185167 A1 | * | 12/2002 | Lin | E04H 12/2238 135/48 |
| 2013/0092199 A1 | * | 4/2013 | Berland | A45B 25/00 135/25.1 |
| 2019/0338549 A1 | * | 11/2019 | McDermott | E02D 5/801 |
| 2021/0332937 A1 | * | 10/2021 | Li | F16M 11/34 |

FOREIGN PATENT DOCUMENTS

| | | | | |
|---|---|---|---|---|
| CN | 106678520 A | * | 5/2017 | |
| CN | 110209001 A | * | 9/2019 | F16M 11/04 |
| CN | 214171846 U | * | 9/2021 | |
| CN | 216280473 U | | 4/2022 | |
| WO | WO-2015062120 A1 | * | 5/2015 | F16M 11/046 |

OTHER PUBLICATIONS

Limostudio lamp umbrella holder model No. AGG2945 dated Aug. 19, 2019 sold on amazon.com, https://www.amazon.com/LimoStudio-Photography-Adjustable-Lightweight-Tripods/dp/B07WSJRP3R (Year: 2019).*

Manfrotto MS0490C nanopole stand, https://www.bhphotovideo.com/c/product/1507941-REG/manfrotto_ms0490c_carbon_fiber_nanopole.html https://web.archive.org/ earliest dated Aug. 27, 2021 (Year: 2021).*

Manfrotto MS0490C nanopole stand user manual dated Sep. 2019; https://www.bhphotovideo.com/lit_files/577199.pdf (Year: 2019).*

Belchfire heavy duty torch stand; https://www.belchfire.com/shop/heavy-duty-torch-stand/, https://web.archive.org/ dated: Jan. 16, 2021 (Year: 2021).*

Chinese Office Action issued in App. No. CN202122328601.3, dated Mar. 16, 2022, 2 pages.

Chinese Office Action issued in App. No. CN202122328601.3, dated Dec. 24, 2021, 2 pages.

Chinese Office Action issued in App. No. CN202122328601.3, dated Sep. 27, 2021, 3 pages.

* cited by examiner

MULTIFUNCTIONAL BRACKET

CROSS REFERENCE TO RELATED APPLICATIONS

This application claims priority to Application Serial Number 2021223286013, filed in The People's Republic of China on 2021 Sep. 24, the entire contents of which is expressly incorporated herein by reference.

STATEMENT RE: FEDERALLY SPONSORED RESEARCH/DEVELOPMENT

Not Applicable.

BACKGROUND

The invention relates to the technical field of a pan tilt, and in particular to a multifunctional support stand.

With development of science and technology, various electronic apparatuses have emerged, especially a smart phone, a tablet computer, a handheld learning machines, etc. A supporting bracket or a pan tilt that is supported with the electronic apparatuses is usually only used by a single product. A user often needs to buy a mobile phone support stand, a tablet computer support stand, a projector support stand and other support stands. Therefore, cost of purchasing the support stand or the pan tilt by the user is high, and it is more troublesome to use the support stand or the pan tilt.

Therefore, there is an urgent need to design a support stand capable of supporting various electronic apparatuses.

BRIEF SUMMARY

A main objective of the invention is to provide a multifunctional support stand, which aims to realize a support stand for supporting various electronic apparatuses, so as to be convenient for users to use.

In order to achieve the forgoing objective, the invention provides a multifunctional support stand, including:
- a supporting assembly having a first end and a second end that are opposite to each other;
- a pan-tilt assembly being telescopically arranged at the first end of the supporting assembly, and the pan-tilt assembly being configured to be placed with a load device; and
- a tripod assembly being switchably arranged at the second end of the supporting assembly between a support position and a storage position.

Optionally, the supporting assembly includes:
- a pulling-rod assembly comprising an outer pulling rod, as well as a first eccentric rod and a second eccentric rod that are telescopically connected to the outer pulling rod, and an outer end of the second eccentric rod being the first end of the supporting assembly;
- a sleeve assembly being sleeved on an outer end of the outer pulling rod, and the pan-tilt assembly being connected to the outer end of the second eccentric rod and movably embedded in the sleeve assembly; and
- a locking knob assembly being screwed on the sleeve assembly for loosening or locking the pan-tilt assembly.

Optionally, the sleeve assembly includes a support stand sleeve and a nut embedded in the support stand sleeve, and the locking knob assembly is provided with inner inlaid studs that are screwed and fitted with each other at a position corresponding to the nut, so that the locking knob assembly is threadedly connected to the sleeve assembly.

Optionally, the locking knob assembly further includes a knob and a position-limit block. One end of the inner inlaid stud is fixed in the knob, and the other end of the inner inlaid stud is screwed into the nut and abuts against the position-limit block, and the position-limit block is connected to the pulling-rod assembly to limit axial telescopic movement of the pulling-rod assembly.

Optionally, the pan-tilt assembly includes a pan-tilt cover and a spring hose. The pan-tilt cover is connected to the outer end of the second eccentric rod via the spring hose. The spring hose is capable of being stored in the pulling-rod assembly, and when the spring hose is in an stored state, the pan-tilt cover is threadedly connected to the support stand sleeve.

Optionally, the pan-tilt assembly further includes an inner tube tail plug, and the spring hose is connected to the outer end of the second eccentric rod via the inner tube tail plug.

Optionally, the pan-tilt cover includes a pan-tilt knob, a stud, and a cover plate. The cover plate is covered and provided on the pan-tilt knob. The pan-tilt knob is threadedly connected to the support stand sleeve. One end of the stud is fixed on the pan-tilt knob, and the other end of the stud is protruded out of the pan-tilt knob via the cover plate.

Optionally, the tripod assembly includes a plurality of tripod handles and a plurality of supporting rods. The plurality of tripod handles are arranged on a peripheral wall of the outer pulling rod via a tripod seat, respectively. The supporting rod and the tripod handle are arranged one-to-one. One end of the supporting rod is arranged on the outer pulling rod via a fixing seat, and the other end of the supporting rod is slidably connected to the tripod handle.

Optionally, the tripod seat includes a tripod surface cover and a tripod bottom cover. The tripod surface cover is fixed on the outer pulling rod, and the tripod bottom cover is covered and provided on the tripod surface cover;

The tripod assembly further includes a first ground nail and a second ground nail. The first ground nail is arranged on a proximal end of the tripod surface cover, and the second ground nail is provided on a proximal ground end of each of the tripod handles.

Optionally, the fixing seat includes a handle seat and a fixing rotating ring. The handle seat is sleeved on the outer pulling rod. Ends of the plurality of supporting rods are spaced and provided on the handle seat, and the fixing rotating ring is sleeved on the outer pulling rod and threadedly connected to the handle seat to loosen or lock the handle seat and the outer pulling rod, thereby adjusting opening angles of the plurality of tripod handles.

In the technical solution of the invention, a multifunctional support stand includes a supporting assembly, a pan-tilt assembly, and a tripod assembly. The supporting assembly has a first end and a second end that are opposite to each other in a length direction thereof. The pan-tilt assembly is telescopically arranged on the first end of the supporting assembly. The pan-tilt assembly is configured to be placed with a load device. The tripod assembly is switchably arranged at the second end of the supporting assembly between a support position and a storage position.

Therefore, the pan-tilt assembly may be telescopically converted among different support positions, and the tripod assembly may well support the whole pan-tilt assembly and a load thereon, thus realizing the function of supporting the support stand of various electronic apparatus, which is convenient for a user. At the same time, the tripod assembly is switchably arranged at the second end of the supporting assembly between the support position and the storage position, thus realizing a storage function of the tripod assembly and improving convenience of the user.

BRIEF DESCRIPTION OF THE DRAWINGS

In order to explain embodiments the invention or the technical solutions in the prior art more clearly, the following briefly introduces the drawings that need to be used in the embodiments or the prior art. Obviously, the drawings in the following description are only some of embodiments of the invention. The person skilled in the art may obtain other drawings based on structures shown in these drawings without creative labor.

DETAILED DESCRIPTION

The Description of Reference Signs

10. Support assembly; 20. Pan-tilt assembly; 30. Tripod assembly; 11. Pulling-rod assembly; 12. Sleeve assembly; 13. Locking knob assembly; 111. Outer pulling rod; 112. First eccentric rod; 113. Second eccentric rod; 121. Support stand sleeve; 122. Nut; 131. Inner inlaid stud; 132. Knob; 133. Position-limit block; 21. Pan-tilt cover; 22. Spring hose; 23. Inner tube tail plug; 211. Pan-tilt knob; 212. Stud; 213. Cover plate; 31. Tripod handle; 32. Supporting rod; 40. Tripod seat; 50. Fixing seat; 41. Tripod surface cover; 42. Tripod bottom cover; 43. First ground nail; 44. Second ground nail; 51. Handle seat; 52. Fixing rotating ring.

The realization, functional characteristics and advantages of the objective of the invention will be further described with reference to the accompanying drawings in conjunction with the embodiments.

The following clearly and completely describe the technical solutions in embodiments of the invention in conjunction with the accompanying drawings in the embodiments of the invention. Obviously, the described embodiments are only a part of the embodiments of the invention, rather than all embodiments. Based on the embodiments of the invention, all other embodiments obtained by the person skilled in the art without creative labor shall fall within the protection scope of the invention.

It should be noted that all directional indications (such as up, down, left, right, front, back . . . ) in the embodiments of the invention are only used to explain a relative position relationship and movement among various components under a certain posture (as shown in the accompanying drawings). If the specific posture changes, the directional indication also changes accordingly.

In addition, the terms such as "first" and "second" in the invention are merely intended for a purpose of description, and shall not be understood as an indication or implication of relative importance or implicit indication of a quantity of indicated technical features. Therefore, the features defined with "first" and "second" may explicitly or implicitly include at least one of the features. In addition, the meaning of "and/or" in the whole text is to include three parallel schemes. Taking "A and/or B" as an example, "A and/or B" includes scheme A, scheme B, or a scheme that A and B are satisfied at the same time. In addition, the technical solutions between the various embodiments may be combined with each other, but should be based on what may be achieved by the person skilled in the art. When a combination of technical solutions is contradictory or cannot be achieved, it should be considered that such a combination of technical solutions does not exist, and also does not fall within the scope of protection required by the invention.

The invention proposes a multifunctional support stand, which may be applied to various indoor and outdoor scenarios, is suitable for supporting small-load digital products such as a smart phone and a tablet computer, may adjust an angle and a height according to user requirements, and may also be suitable for supporting a projector, a laser TV and other large-load devices. The arbitrarily adjusted supporting pan tilt may be switched to a large-load pan tilt, which may also meet outdoor needs. The multifunctional support stand may be configured to support a camera, an astronomical telescope and other apparatuses, and has stable support and wind resistance.

Figure 1:
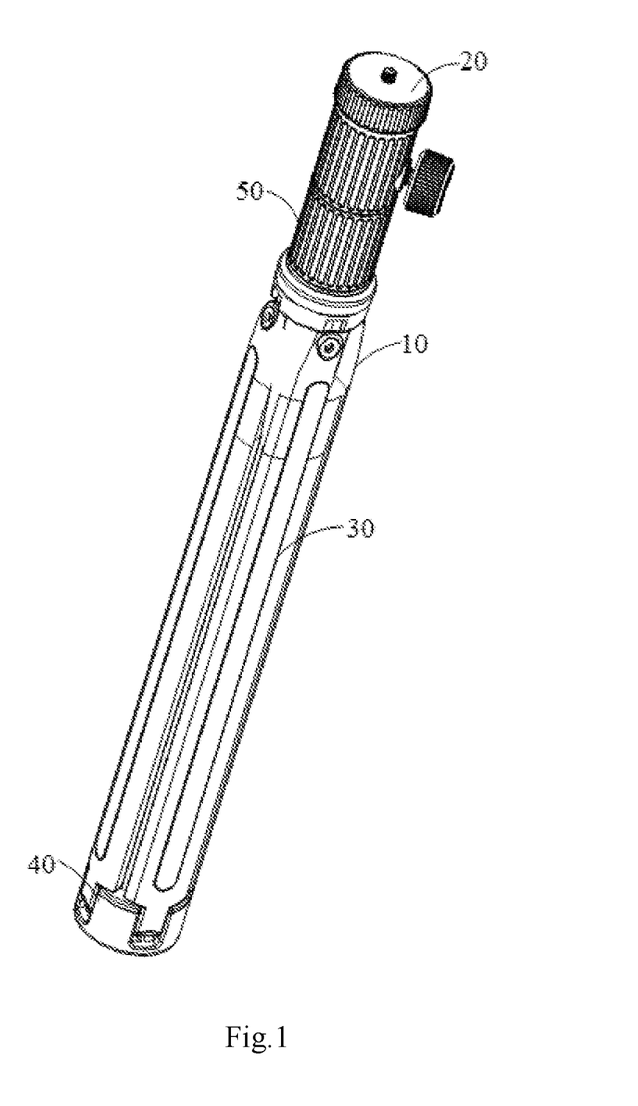
FIG. 1 is a schematic structural diagram of an embodiment of a multifunctional support stand of the invention.
Figure 2:
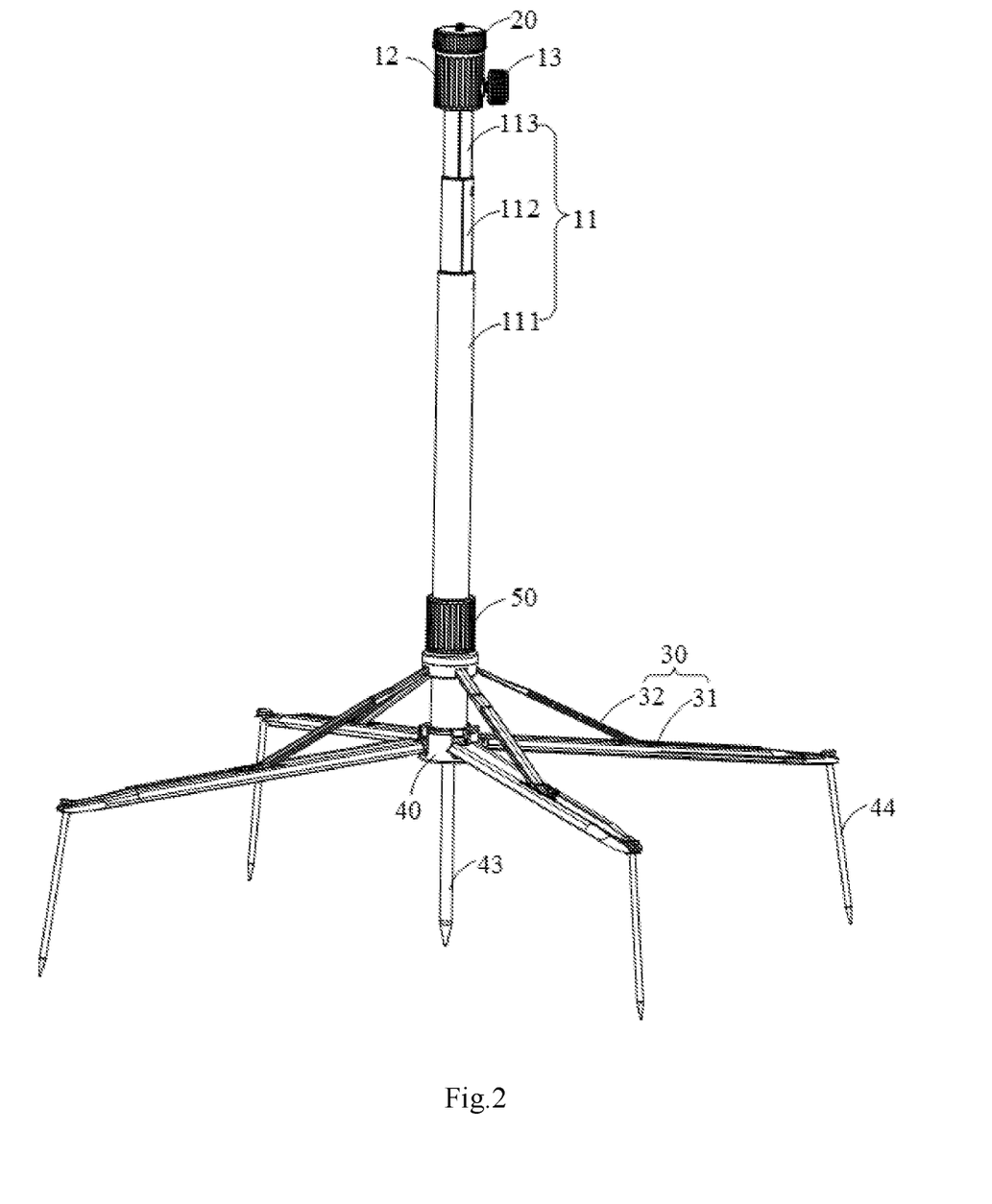
FIG. 2 is a schematic structural diagram of an embodiment of a multifunctional support stand of the invention in a supporting state.

Referring to FIGS. 1 and 2, in an embodiment of the invention, the multifunctional support stand includes a supporting assembly 10, a pan-tilt assembly 20, and a tripod assembly 30. The supporting assembly 10 has a first end and a second end that are opposite to each other. The pan-tilt assembly 20 is telescopically arranged at the first end of the supporting assembly 10. The pan-tilt assembly 20 is configured to be placed with a load device. The tripod assembly 30 is switchably arranged at the second end of the supporting assembly 10 between a support position and a storage position.

In this embodiment, the supporting assembly 10 may be assembled by a plurality of components, which may be a plastic member, a metal member or a combination thereof. This is not limited here. Preferably, the supporting assembly 10 may adopt a long cylindrical structure. This hollow structure may not only save material consumption, but also ensure the overall stability.

The pan-tilt assembly 20 may include a telescopic member and a supporting table. The telescopic member may be a spring hose, a sliding mechanism, a lifting mechanism, etc. The supporting table may be designed according to main application products or may be a variety of support table structures that are easily replaced conveniently by a user. This is not limited here.

The tripod assembly 30 may consist of three or more supporting legs. The supporting legs may be evenly distributed along a peripheral wall of the supporting assembly 10, and may be arranged at a proximal end of the supporting assembly 10 via a folding mechanism, a telescopic mechanism, etc., A specific structure is not limit here.

It may be understood that in the invention, the supporting assembly 10 of the multifunctional support stand is provided with a first end and a second end that are opposite to each other. The pan-tilt assembly 20 is telescopically arranged on the first end of the supporting assembly 10. The pan-tilt assembly 20 is configured to be placed with a load device. The tripod assembly 30 is switchably arranged at the second end of the supporting assembly 10 between a support position and a storage position. Therefore, the pan-tilt assembly 20 may be telescopically converted among different support positions, and the tripod assembly 30 may well support the whole pan-tilt assembly 20 and a load thereon, thus realizing the function of supporting the support stand of various electronic apparatuses, which is convenient for a user. At the same time, the tripod assembly 30 is switchably arranged at the second end of the supporting assembly 10 between the support position and the storage position, thus realizing a storage function of the tripod assembly 30 and improving convenience of the user.

Figure 3:
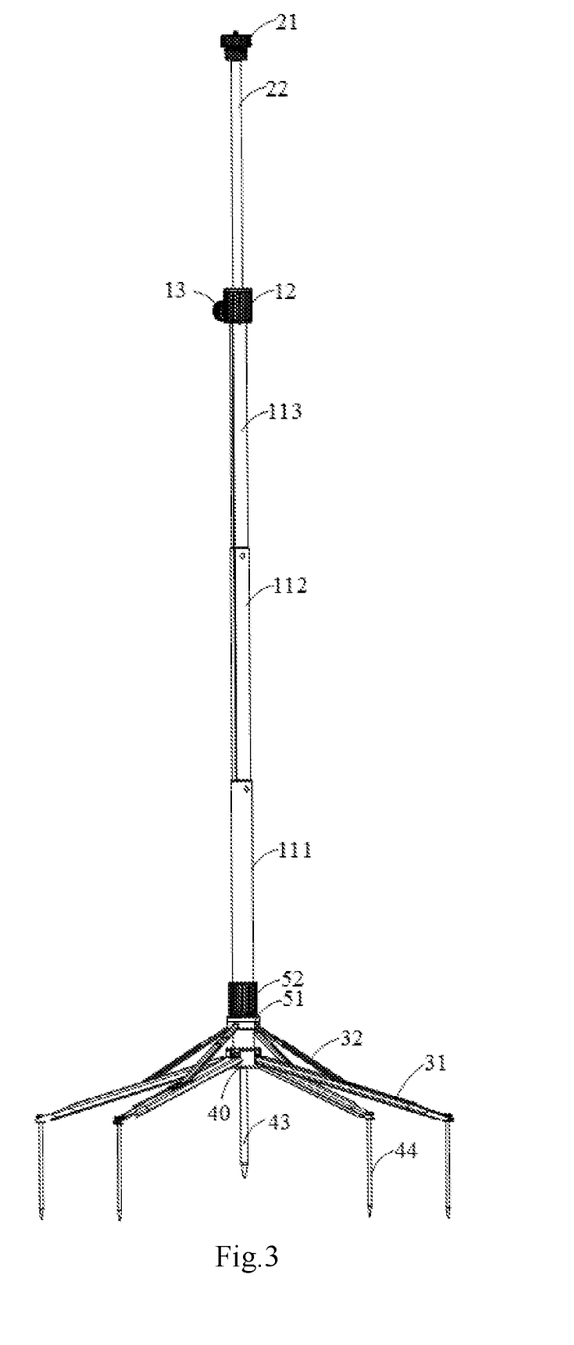
FIG. 3 is a schematic structural diagram of an embodiment of a multifunctional support stand of the invention in a yet supporting state.
Figure 4:
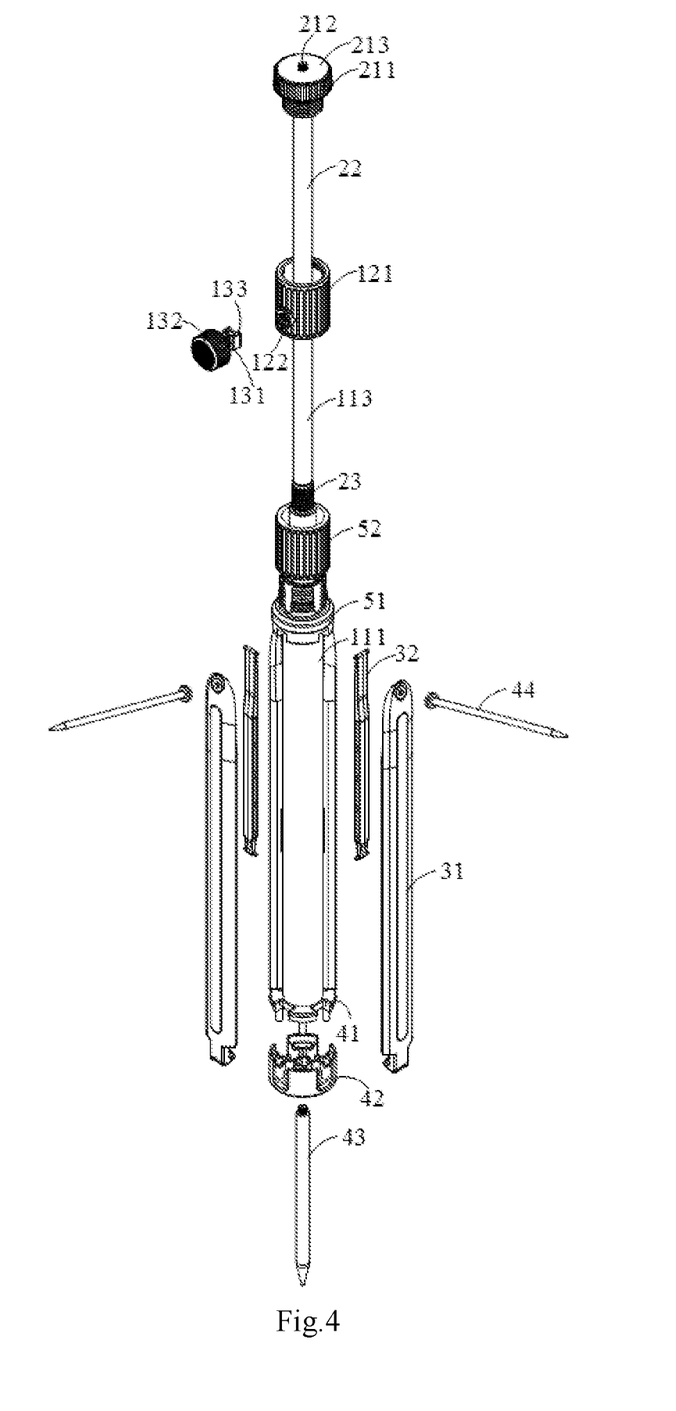
FIG. 4 is an exploded diagram of an embodiment of a multifunctional support stand of the invention.

In order to further improve stability of the multifunction support stand while being capable of adjusting the pan-tilt assembly 20 among a plurality of positions, so as to carry a small load product and a large load product, in one embodiment, referring to FIGS. 2 to 4, the supporting assembly 10 may include a pulling-rod assembly 11, a sleeve assembly 12, and a locking knob assembly 13. The pulling-rod assembly 11 includes an outer pulling rod 111, as well as a first eccentric rod 112 and a second eccentric rod 113 that are telescopically connected to the outer pulling rod 111. An outer end of the second eccentric rod 113 is the first end of the supporting assembly 10. The sleeve assembly 12 is sleeved on an outer end of the outer pulling rod 111. The pan-tilt assembly 20 is connected to an outer end of the second eccentric rod 113 and movably embedded in the sleeve assembly 12. The locking knob assembly 13 is screwed to the sleeve assembly 12 for loosening or locking the pan-tilt assembly 20.

In this embodiment, the first eccentric rod 112 has an outer diameter smaller than that of the outer pulling rod 111. The second eccentric rod 113 has an outer diameter smaller than that of the first eccentric rod 112. The first eccentric rod 112 may be stored in the outer pulling rod 111. The second eccentric rod 113 may be stored in the outer pulling rod 112. In addition, the first eccentric rod 112 and the second eccentric rod 113 are arranged so that the overall center of gravity of the multifunctional support stand may be more stable in a support scenario where the first eccentric rod 112 and the second eccentric rod 113 are extended, which greatly improves stability of the multifunctional support stand.

In order to improve the stability and ease of use of the multifunctional support stand, in one embodiment, referring to FIG. 3 and FIG. 4, the sleeve assembly 12 may include a support stand sleeve 121 and a nut 122 embedded in the support stand sleeve 121. The locking knob assembly 13 is provided with inner inlaid studs 131 that are screwed and fitted with each other at a position corresponding to a nut 122, so that the locking knob assembly 13 is threadedly connected to the sleeve assembly 12.

Figure 7:
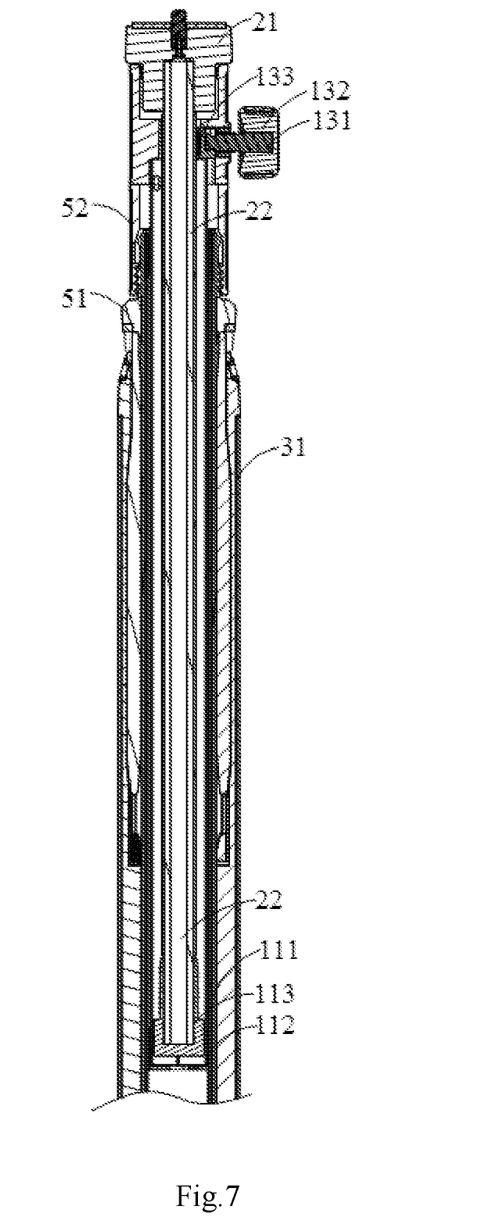
FIG. 7 is a partial sectional view of an embodiment of a multifunctional support stand when a pan-tilt assembly is in a contracted state.
Figure 8:
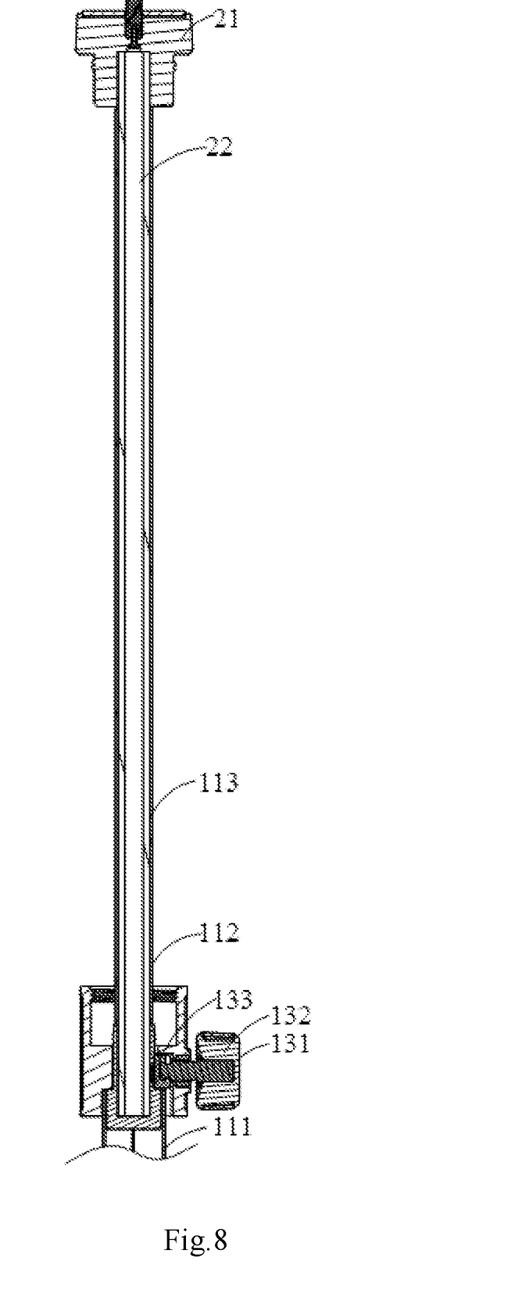
FIG. 8 is a partial sectional view of an embodiment of a multifunctional support stand of the invention when a pan-tilt assembly is in an extended state.

Further, in an embodiment, referring to FIG. 3 and FIG. 4, the locking knob assembly 13 further includes a knob 132 and a position-limit block 133. One end of the inner inlaid stud 131 is fixed at the knob 132, and the other end of the inner inlaid stud 131 is screwed into the nut 122 and abuts against the position-limit block 133. As shown in FIG. 7 and FIG. 8, the position-limit block 133 is connected to the pulling-rod assembly 11 to limit axial telescopic movement of the pulling-rod assembly 11. This arrangement may enhance stability of the entire support stand, and at the same time, it is also convenient for the user to lock the pan-tilt assembly 20 and adjust the appropriate position so that the user conveniently uses the support stand.

In order to realize a function that the pan tilt may be adjusted at any angle so that the user conveniently uses the multifunctional support stand to support products such as a smartphone and a camera, in an embodiment, referring to FIGS. 1 to 3, the pan-tilt assembly 20 may include a pan-tilt cover 21 and a spring hose 22. The pan-tilt cover 21 is connected to the outer end of the second eccentric rod 113 via the spring hose 22. The spring hose 22 may be stored in the pulling-rod assembly 11. When the spring hose 22 is in a storage state, the pan-tilt cover 21 is threadedly connected to the support stand sleeve 121.

The spring hose 22 is connected to the pan-tilt cover 21 and the second eccentric rod 113. On the one hand, the pan-tilt may be adjusted at any angle. On the other hand, a length of the entire supporting assembly 10 may be lengthened to use a more wide range of application scenarios to improve practicability.

In this embodiment, the multifunctional support stand is an integrated portable lazy support stand. The spring hose 22 is hidden inside the second eccentric rod 113. After being stored, the support stand has an integrated shape, which is convenient to carry and has a neat appearance. A position of the pan tilt may be adjusted arbitrarily by pulling out the spring hose 22. The spring hose 22 may be retracted and locked in a sleeve to form an integrated strong and stable pan tilt. The support stand may also be used as a support stand for a projector, an aurora TV, etc., which greatly enriches a use scenario.

In this embodiment, as shown in FIGS. 7 and 8, the position-limit block 133 may be configured to limit and compress the spring hose 22 of the pan-tilt assembly 20 under control of the knob 132, thereby limiting the axial telescopic movement of the pulling-rod assembly 11 to provide the stability of this multifunctional support stand.

Referring mainly to FIG. 4, in one embodiment, the pan-tilt assembly 20 may further include an inner tube tail plug 23. The spring hose 22 is connected to the outer end of the second eccentric rod 113 via the inner tube tail plug 23. With this arrangement, the spring hose 22 may be conveniently connected to the second eccentric rod 113. Telescopic movement of the second eccentric rod 113 is not affected, and the stability of the entire support stand may also be improved.

In order to improve stability of the pan tilt of the multifunctional support stand and facilitate connection of the supporting assembly 10, in an embodiment, referring mainly to FIG. 3 and FIG. 4, the pan-tilt cover 21 may include a pan-tilt knob 211, a stud 212, and a cover plate 213. The cover plate 213 is covered and provided on the pan-tilt knob 211. The pan-tilt knob 211 is threadedly connected to the support stand sleeve 121. One end of the stud 212 is fixed on the pan-tilt knob 211, and the other end of the stud 212 is protruded out of the pan-tilt knob 211 via the cover plate 213.

In this embodiment, the pan-tilt knob 211 and the cover plate 213 may have a function of supporting a small-load product and a large-load product. At the same time, a helical structure is arranged so that the pan-tilt assembly 20 is threadedly connected to the support stand sleeve 121, thus realizing a stabler performance.

During operation, the pan-tilt cover 21 is rotated and tightened in the outer pulling rod 111. The spring hose 22 may form a large-load pan tilt, which may be configured to be placed with relatively heavy apparatuses such as the projector and a smart TV. The pan-tilt cover 21 is rotated, unscrewed and pulled up to form a free pan tilt, which may hold relatively light products such as the smart phone and a tablet.

In order to improve the stability of the multifunctional support stand when supporting a large-load product, in one embodiment, referring to FIG. 1 to FIG. 4, the stand assembly 30 may include a plurality of tripod handles 31 and a plurality of supporting rods 32. The plurality of tripod handles 31 are arranged on the peripheral wall of the outer pulling rod 111 via the tripod seat 40, respectively. The supporting rod 32 and the tripod handle 31 are arranged one-to-one. One end of the supporting rod 32 is arranged on the outer pulling rod 111 via the fixing seat 50, and the other end of the supporting rod 32 is slidably connected to the tripod handle 31. In this way, a plurality of supporting rods 32 with sliding structures are arranged so that the tripod handle 31 may be slidably switched between the support position and the storage position, which improves convenience of use of the multifunctional support stand, and ensures a certain stability while being also convenient for the user to store and carry.

Further, in some embodiments, referring to FIG. 3 and FIG. 4, the tripod seat 40 may include a tripod surface cover 41 and a tripod bottom cover 42. The tripod surface cover 41 is fixed on the outer pulling rod 111. The tripod bottom cover 42 is covered and provided on the tripod surface cover 41. The tripod assembly 30 also includes a first ground nail 43 and a second ground nail 44. The first ground nail 43 is arranged on a proximal ground end of the tripod surface cover 41. The second ground nail 44 is provided on a proximal ground end of each of the tripod handles 31.

It should be noted that the first ground nail 43 and the second ground nail 44 are configured accessories. In an outdoor scenario, the first ground nail 43 and the second ground nail 44 are inserted into corresponding ground nail holes on the support stand for use.

It may be understood that since the first ground nail 43 and the second ground nail 44 are arranged, the multifunctional support stand may be configured to support large-load products such as the projector, the camera, and the astronomical telescope when being outdoors.

In order to facilitate adjustment of the tripod assembly 30 so as to allow the user to flexibly adjust the tripod handle 31 to be switched between the storage position and the support position, in an embodiment, referring to FIG. 3 to FIG. 6, the fixing seat 50 includes a handle seat 51 and a fixing rotating ring 52. The handle seat 51 is sleeved on the outer pulling rod 111. Ends of the plurality of supporting rods 32 are spaced and arranged on the handle seat 51. The fixing rotating ring 52 is sleeved on the outer pulling rod 111 and threadedly connected to the handle seat 51 to loosen or lock the handle seat 51 and the outer pulling rod 111, thereby adjusting the opening angles of the plurality of tripod handles 31.

Figure 5:
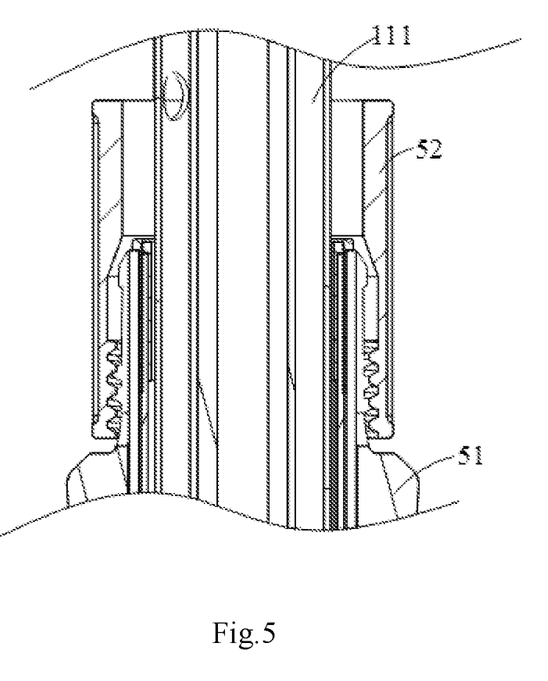
FIG. 5 is a partial sectional view of a multifunctional support stand of the invention when a fixing rotating ring and a handle seat are in a loosened state.
Figure 6:
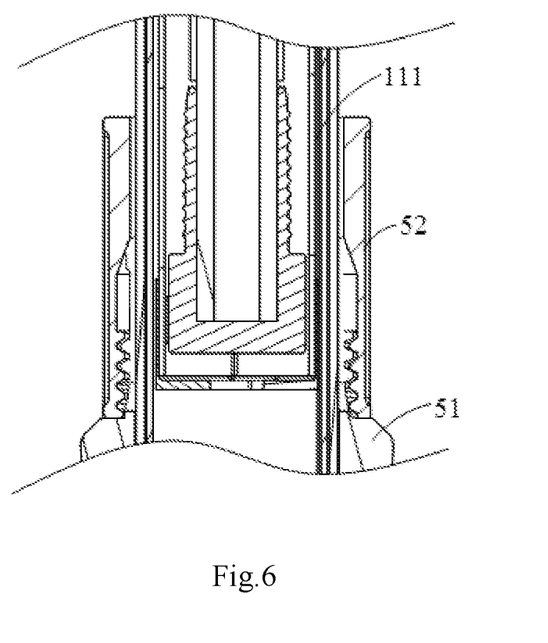
FIG. 6 is a partial sectional view of a multifunctional support stand of the invention when a fixing rotating ring and a handle seat are in a locked state.

In this embodiment, the fixing rotating ring 52 is rotated to squeeze the handle seat 51 to hold the outer pulling rod 111 tightly so that the tripod handle 31 may be tightened by the supporting rod 32 without loosening. When being opened, the fixing rotating ring 52 is rotated in a clockwise direction or a counterclockwise direction. A tripod is opened. The fixing rotating ring 52 is rotated in a opposite direction to be locked tightly. The tripod handle 31 may be tightened by the supporting rod 32 to maintain a stable locking state, so that the tripod assembly 30 may stably support the pan-tilt assembly 20 and a load thereon.

During use, when being in the storage position, the tripod assembly 30 may be adjusted to a support state by opening the tripod handle 31. During this process, the supporting rod 32 moves down and supports the tripod handle 31. The fixing rotating ring 52 is rotated to loosen the handle seat 51 and the outer pulling rod 111. The tripod handle 31 or the fixing seat 50 is moved up and down to adjust an opening angle of the tripod handle 31, and then adjust a support range of the tripod handle 31 to a suitable support angle. The fixing rotating ring 52 is then rotated to lock and fix the handle seat 51 and the outer pulling rod 111. When the tripod assembly 30 is in a supporting position, the fixing rotating ring 52 may be loosened first, and then the tripod handle 31 may be pushed upward to switch a self-supporting state to a storage state. During this process, the tripod handle 31 drives the supporting rod 32 to move upward so as to complete storage of the tripod assembly 30.

It should be noted that, according to different use scenarios, the tripod assembly 30 may be adjusted to open different supporting areas. Hole positions are reserved at a bottom of the tripod bottom cover 42 and an end of the tripod handle 31. According to whether a use site is a lawn, a beach, a mud ground, etc., it is determined if additional reinforcement with a ground nail is required.

It is worth mentioning that an overall shape of the multifunctional support stand is not limited to a cylindrical shape, but may also be a square shape or other shapes. The tripod assembly 30 is not limited to three legs, but may also be four or more legs.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A multifunctional support stand, comprising:
   a supporting assembly having a first end and a second end that are opposite to each other;
   a pan-tilt assembly being telescopically arranged at the first end of the supporting assembly, and the pan-tilt assembly being configured to be placed with a load device; and
   a tripod assembly being switchably arranged at the second end of the supporting assembly between a support position and a storage position;
   wherein the supporting assembly comprises:
   a pulling-rod assembly comprising an outer pulling rod, as well as a first eccentric rod and a second eccentric rod that are telescopically connected to the outer pulling rod, and an outer end of the second eccentric rod being the first end of the supporting assembly;
   a sleeve assembly being sleeved on an outer end of the second eccentric rod, and the pan-tilt assembly being connected to the outer end of the second eccentric rod and movably embedded in the sleeve assembly; and
   a locking knob assembly being screwed on the sleeve assembly for loosening or locking the pan-tilt assembly;
   wherein the tripod assembly comprises a plurality of tripod handles and a plurality of supporting rods, the plurality of tripod handles are arranged on a peripheral wall of the outer pulling rod via a tripod seat, respectively, the supporting rod and the tripod handle are arranged one-to-one, one end of the supporting rod is arranged on the outer pulling rod via a fixing seat, and the other end of the supporting rod is slidably connected to the tripod handle.

2. The multifunctional support stand according to claim 1, wherein the sleeve assembly comprises a support stand sleeve and a nut embedded in the support stand sleeve, and the locking knob assembly is provided with inner inlaid studs that are screwed fitted with each other at a position corresponding to the nut, so that the locking knob assembly is threadedly connected to the sleeve assembly.

3. The multifunctional support stand according to claim 2, wherein the locking knob assembly further comprises a knob and a position-limit block, one end of the inner inlaid stud is fixed in the knob, and the other end of the inner inlaid stud is screwed into the nut and abuts against the position-limit block, and the position-limit block is connected to the pulling-rod assembly to limit axial telescopic movement of the pulling-rod assembly.

4. The multifunctional support stand according to claim 3, wherein the pan-tilt assembly comprises a pan-tilt cover and a spring hose, the pan-tilt cover is connected to the outer end of the second eccentric rod via the spring hose, the spring hose is capable of being stored in the pulling-rod assembly, and when the spring hose is in an stored state, the pan-tilt cover is threadedly connected to the support stand sleeve.

5. The multifunctional support stand according to claim 4, wherein the pan-tilt assembly further comprises an inner tube tail plug, and the spring hose is connected to the outer end of the second eccentric rod via the inner tube tail plug.

6. The multifunctional support stand according to claim 4, wherein the pan-tilt cover comprises a pan-tilt knob, a stud and a cover plate, the cover plate is covered and provided on the pan-tilt knob, the pan-tilt knob is threadedly connected to the support stand sleeve, one end of the stud is fixed on the pan-tilt knob, and the other end of the stud is protruded out of the pan-tilt knob via the cover plate.

7. The multifunctional support stand according to claim 1, wherein the tripod seat comprises a tripod surface cover and a tripod bottom cover, the tripod surface cover is fixed on the outer pulling rod, and the tripod bottom cover is covered and provided on the tripod surface cover;

the tripod assembly further includes a first ground nail and a second ground nail, the first ground nail is arranged on a proximal end of the tripod surface cover, and the second ground nail is provided on a proximal ground end of each of the tripod handles.

8. The multifunctional support stand according to claim 1, wherein the fixing seat comprises a handle seat and a fixing rotating ring, the handle seat is sleeved on the outer pulling rod, ends of the plurality of supporting rods are spaced and provided on the handle seat, and the fixing rotating ring is sleeved on the outer pulling rod and threadedly connected to the handle seat to loosen or lock the handle seat and the outer pulling rod, thereby adjusting opening angles of the plurality of tripod handles.

* * * * *